United States Patent [19]

Kobayashi et al.

[11] 4,400,639
[45] Aug. 23, 1983

[54] ROTOR CORE OF ELECTRIC ROTARY MACHINE

[75] Inventors: Junichi Kobayashi, Funabashi; Takao Mifune, Ichikawa; Shoji Tanabe, Sakura, all of Japan

[73] Assignee: Hitachi, Ltd., Tokyo, Japan

[21] Appl. No.: 210,811

[22] Filed: Nov. 26, 1980

[30] Foreign Application Priority Data

Nov. 28, 1979 [JP] Japan ................. 54-152951

[51] Int. Cl.³ .............................................. H02K 3/34
[52] U.S. Cl. ..................................... 310/215; 310/214; 310/270
[58] Field of Search ............... 310/214, 215, 270, 50, 310/156, 217, 42, 43, 45, 261, 4, 5

[56] References Cited

U.S. PATENT DOCUMENTS

| 630,930 | 8/1899 | Reist | 310/270 |
|---|---|---|---|
| 2,173,726 | 9/1939 | Prindle | 310/215 |
| 3,196,304 | 7/1969 | Koehly et al. | 310/214 |
| 3,646,374 | 2/1972 | Jordan et al. | 310/45 |

FOREIGN PATENT DOCUMENTS

| 36540 | 4/1956 | Fed. Rep. of Germany | 310/215 |
|---|---|---|---|
| 2247842 | 5/1975 | France | 310/42 |
| 505477 | 5/1939 | United Kingdom | 310/215 |

*Primary Examiner*—J. D. Miller
*Assistant Examiner*—D. Rebsch
*Attorney, Agent, or Firm*—Antonelli, Terry & Wands

[57] ABSTRACT

A rotor core of an electric rotary machine is provided with a number of slots opening toward the outer peripheral surface of the core and teeth formed between the slots. At the sides of the rotor core are mounted spidery end plates having notches opposing the slots and projections opposing the teeth. That end surface of the projection which is remote from the rotor core is formed to extend farther from the end surface of the rotor core as it becomes distant from the axis of the rotor core. The rotor winding is wound about the rotor core and spidery end plates to be buried in the slots and notches, the bottom of the notch being higher than the laminate slot, so that the slot liner is not distorted during winding operations.

3 Claims, 6 Drawing Figures

U.S. Patent     Aug. 23, 1983     4,400,639
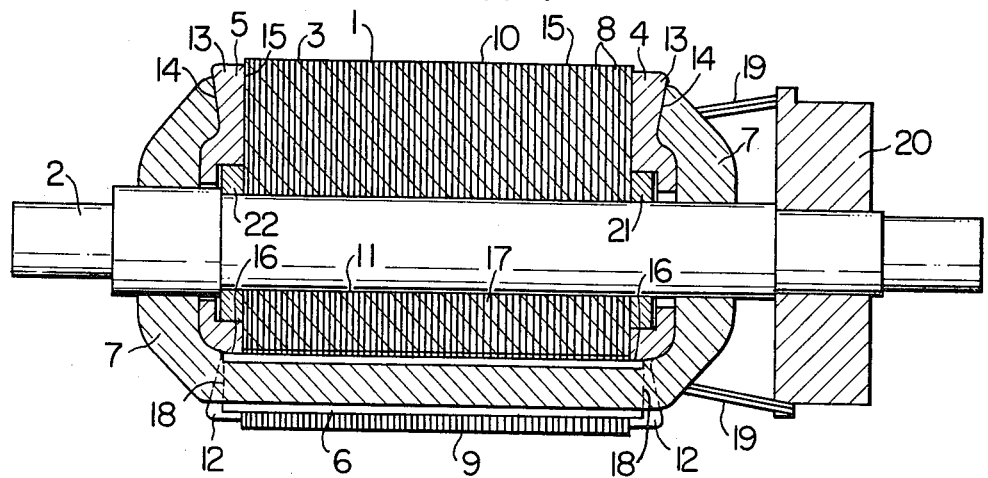
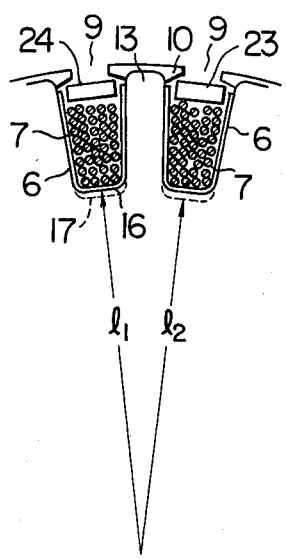
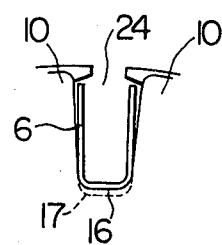
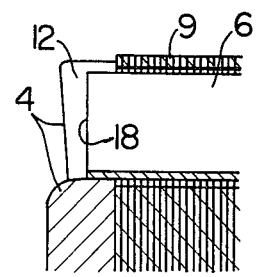
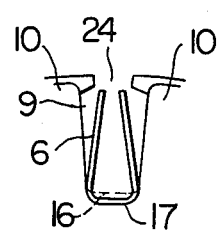
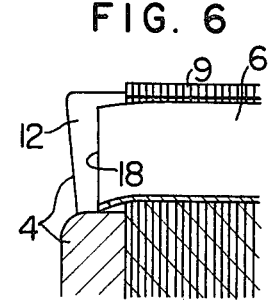

ROTOR CORE OF ELECTRIC ROTARY MACHINE

BACKGROUND OF THE INVENTION

1. Field of the Invention

The present invention relates to a rotor of an electric rotary machine constructed such that a rotor winding is buried in slots which open toward the outer peripheral surface of the rotor core, and particularly to a rotor the winding of which is easy to be directly wound by a winding machine.

2. Description of the Prior Art

An induction motor is inadequate for driving a load which needs a speed change. However, an induction motor is still widely used, in combination with an electrical or mechanical speed change gear, for driving a load which is required to be varied in speed. An induction motor used in combination with an electrical or mechanical speed change gear, however, has very poor efficiency. From the standpoint of saving electric power consumption, it is desirable that a direct current motor which is easily controlled in speed be used for driving such a load of the type which requires speed variation. The application of a D.C. motor to such load has not yet become widespread, because the direct current motor is expensive. In general, an electrical machine having a rotor the winding of which is buried in slots which open toward the outer peripheral surface of the rotor core, as seen not only in the D.C. motor but also in a repulsion start induction motor, is very expensive. The reason for this is that the winding operation requires a number of manufacturing steps and in addition, since the rotor, unlike the stator, is affected by centrifugal force, the winding operation needs high skill.

Various researches have been made for mechanization of the operation of burying the winding conductors in the rotor core slots, but such mechanization has been put into practice only for small-sized motors of 1 kW or below. The difficulty which has been encountered in mechanizing the winding operation is how the coil end is made dense or compact. If the coil end is not dense, the entire length of the motor in the axial direction becomes large, raising the cost. In addition, the rotor winding is affected by the centrifugal force and consequently the conductors thereof are moved by such force. Thus, there is a fear that dielectric breakdown may be caused.

SUMMARY OF THE INVENTION

Accordingly, it is an object of the invention to construct a rotor capable of having a dense or compact coil end.

It is another object of the invention to construct a rotor capable of having large resistance against centrifugal force.

It is still another object of the invention to construct a rotor capable of easily effecting the winding operation.

The other objects of the invention and the effects associated therewith will be understood from the following description.

In accordance with this invention, there is provided a rotor core having a plurality of slots opening toward the outer peripheral surface and teeth formed between the slots. A spidery end plate is provided at the side of the rotor core having notches opposing the slots and projections opposing the teeth. Such spidery end plates are provided preferably on both sides of the rotor core and the square part thereof contacting the rotor winding is preferably made round. It is desirable to make this spidery end plate of an insulating material such as a synthetic resin. Also, it is desirable to make the surface of the spidery end plate smooth so that the rotor winding may easily slide on the surface.

That end surface of the projection which is remote from the rotor core when looking in the direction of the axis of the rotor core, is, for example, inclined to go away from the end surface of the rotor core as it becomes distant from the axis of the rotor core.

The rotor winding is buried in the slots and notches and tightly wound around the rotor core and spidery end plates. As the rotor winding is wound by a machine in such a manner as described above, the winding conductor is first inserted into the bottoms of the slots and then sequentially wound thereon gradually toward the opening of the slot since the end surface of the projection is inclined to go away from the end surface of the rotor core as it becomes distant from the axis of the rotor core. Therefore, the coil end is also regularly and densely wound. Moreover, since the coil end is densely or compactly wound, the projection or inclined portion increases the length in the axial direction as it goes away from the axis of the rotor core, the rotor winding increases the resistance against centrifugal force. If necessary, insulation is provided between the rotor winding and rotor core, which may be called a slot cell insulation. This slot cell insulation may be an insulating sheet or a coating of insulating paint on the inner peripheral surface of the slots. If an insulating sheet is used for the slot cell insulation, the end of the insulating sheet is preferably placed into the notch, for this decreases the fear that the winding conductor touches the rotor core or the end of the spidery end plate, which may ultimately result in a dielectric breakdown.

When the end of the insulation sheet is placed into the notch, if the bottom of the notch is lower than that of the slot, the opening of the slot cell insulation which is inserted into the slot and the notch with both sides of the sheet being bent in approximately U-shape is closed half during the winding operation, hindering the winding conductor from being wound therethrough. The half closing of the opening is caused due to the fact that both ends of the slot cell insulation sheet approximately of U-shape is pressed against the bottom of the notch, i.e., both the ends are pushed in the opposite direction to the opening of the U-shape.

If the bottom of the slot is completely flushed with that of the notch, there is no fear of the closing, but it is troublesome to control the size of the parts to be used, for such a dimensional accuracy. Thus, if the bottom of the slot is lower than that of the notch, or the distance from the center of the rotor core to the bottom of the slot is made smaller than that to the bottom of the notch, there occurs no such problem. In addition, if this is done, the slot cell insulation is prevented from being directly pressed against the angular end of the bottom of the slot, further decreasing the possibility of dielectric breakdown.

BRIEF DESCRIPTION OF THE DRAWINGS

FIG. 1 is a longitudinal cross-sectional view of an embodiment of the rotor according to the invention.

FIG. 2 shows a cross-section of the main part of the rotor shown in FIG. 1.

FIGS. 3 and 4 show respectively a cross-section and a longitudinal section of the main part of the rotor of the invention, for explaining a state during the manufacturing process of the rotor.

FIGS. 5 and 6 are similar sectional views to FIGS. 3 and 4 for explaining the advantage of the structure shown in FIGS. 3 and 4.

DESCRIPTION OF THE PREFERRED EMBODIMENT

An embodiment of the invention will be described with reference to FIGS. 1 and 2.

A rotor generally designated at numeral 1 has a rotary shaft 2, a rotor core 3, spidery end plates 4 and 5, a slot cell insulator 6, and a rotor winding 7.

The rotor core 3 is formed of the lamination of a number of punched iron plates 8 and has a plurality of slots 9 opening toward the outer peripheral surface of the rotor core and teeth 10 each formed between the adjacent slots 9. The rotor core 3 has also a shaft hole 11 in which the rotary shaft 2 is fixedly mounted.

The spidery end plates 4 and 5 are located at the sides of the rotor core 3 and each have notches 12 opposing the slots, and projections 13 opposing the tooth 10. That end surface 14 of the projection 13, which is remote from the rotor core 3 when looking in the direction of the axis of the rotor core 3, is inclined away from the end surface 15 of the rotor core 3 as it becomes distant from the center of the rotor core 3. The distance $l_1$ from the axis of the rotor core 3 to the bottom 16 of the notch 12 is made slightly longer than the distance $l_2$ to the bottom 17 of the slot 9.

The slot cell insulator 6 is provided between conductors of the rotor winding 7 and the rotor core 3, and the end 18 thereof is placed into the notch 12.

The rotor winding 7 is tightly wound about the rotor core 3 and the spidery end plates 4 and 5 so as to be buried in the slots 9 and the notches 12. The arrangement of the rotor winding 7 in the slots 9 can be made in the same way as in the usual rotor winding for a D.C. motor, and hence a description of such an arrangement is omitted. Each terminal 19 of the rotor winding 7 is connected to a commutator 20.

Numerals 21 and 22 denote collars for fastening the rotor core 3 so as to prevent it from sliding in the direction of lamination, and 23 a wedge.

FIGS. 3 to 6 show the states of an insulation sheet bent approximately in U-shape used as the slot cell insulator 6, which is fitted into the slot 9 with the end 18 being placed into the notch 12. These Figures show the condition when the winding operation has just been started, omitting the winding conductors.

FIGS. 3 and 4 show the case of $l_1 > l_2$, and FIGS. 5 and 6 the case of $l_1 < l_2$.

In FIGS. 3 and 4, the condition that the end 18 of the slot cell insulator 6 is placed on the bottom 16 of the notch 12 and pressed by the conductors successively inserted in the slot 9, the opening 24 of the slot cell insulator 6 is left opened, but in FIGS. 5 and 6, the opening 24 is half closed. Under this condition, the winding operation is difficult. Thus, it is necessary to select the dimensional condition of $l_1 > l_2$.

We claim:

1. A rotor of an electric rotary machine comprising:
   a rotor core having a plurality of slots opening toward the outer peripheral surface of the rotor core and teeth formed between the slots;
   a spidery end plate located at a side of said rotor core and having notches opposing said slots and projections opposing said teeth;
   a rotor winding buried in said slots and said notches and tightly wound about said rotor core and said spidery end plate; and
   slot cell insulators, formed individually and separate from said spidery end plate, provided between said rotor winding and said rotor core, the distance from the axis of said rotor core to a bottom of said notch being made slightly longer than that to a bottom of said slot, and each of said slot cell insulators being formed of an insulating sheet, an end of which is placed into said notch;
   each of said projections of said spidery end plate having an end surface thereof which faces away from said rotor core when looking in the axial direction of said rotor core, said end surface being inclined progressively further away from the end surface of said rotor core as it becomes more distant from the axis of said rotor core at least along a portion thereof extending outward from the bottom of the notch in the radial direction of the rotor core.

2. A rotor according to claim 1, wherein a spidery end plate is provided on both ends of said rotor core.

3. A rotor according to claim 1, wherein said spidery end plate is formed of an insulating material.

* * * * *